US006125162A

United States Patent [19]

English et al.

[11] Patent Number: 6,125,162

[45] Date of Patent: Sep. 26, 2000

[54] POSTAGE METER HAVING NON-GREGORIAN CALENDAR CAPABILITY

[75] Inventors: Kathleen M. English, Milford; Wesley A. Kirschner, Hamden, both of Conn.

[73] Assignee: Pitney Bowes Inc., Stamford, Conn.

[21] Appl. No.: 09/137,445

[22] Filed: Aug. 20, 1998

[51] Int. Cl.[7] ........ G01D 3/00

[52] U.S. Cl. ........ 377/20; 235/377; 346/80; 368/10; 368/28

[58] Field of Search ........ 377/20; 235/377; 346/80; 368/10, 28

[56] References Cited

U.S. PATENT DOCUMENTS

| | | | |
|---|---|---|---|
| 5,197,042 | 3/1993 | Brookner et al. | 368/10 |
| 5,654,893 | 8/1997 | Vermesse | 705/408 |
| 5,881,020 | 3/1999 | Kubatzki | 368/10 |

*Primary Examiner*—Margaret R. Wambach
*Attorney, Agent, or Firm*—Angelo N. Chaclas; Michael E. Melton

[57] ABSTRACT

A postage metering system includes a device to monitor the passage of a unit of time, a calendar profile, a system date and a control system. The calendar profile has parameterized data including day, month, year and leap year information so that dates may be reconciled. The control system is for advancing the system date depending upon the information contained with the calendar profile and the passage of a given amount of time.

12 Claims, 5 Drawing Sheets

POSTAGE METER HAVING NON-GREGORIAN CALENDAR CAPABILITY

FIELD OF THE INVENTION

This invention relates to postage meters. More particularly, this invention is directed to a postage meter having non-Gregorian calendar capability that adapts the postage meter to function using a non-Gregorian calendar.

BACKGROUND OF THE INVENTION

For countless millennia it has been an objective of people to mark the passage of time. To this end, various calendars or systems for reckoning dates have been developed which are based upon religious beliefs, astrological happenings, other factors, or some combination thereof. Examples of such calendars (Gregorian, Julian, Islamic, Judaic, Chinese, etc.) are well known and are employed around the world where different regions favor the usage of a particular calendar.

Oftentimes, it is not easy to reconcile dates between the various calendars as conversion algorithms may become very complex or impossible to implement. This problem is especially true for those calendars that exhibit random date reconciliation characteristics. For example, the Islamic (Hijri) calendar is based upon visual observance of lunar cycles. As a result, the beginning of a new month is linked to actual sightings of a crescent moon from a given locale. Therefore, because sightings are influenced by local weather conditions affecting visibility, actual sightings may not occur uniformly or exactly as anticipated. As a result, weather conditions and differences in the observer's location may even lead to differences between Islamic calendars from different regions.

The great diversity of calendars poses particular difficulties for any company desiring to globally market a product having a calendar based feature. To have the greatest chance of meeting the marketplace with success, the product must adapt to local customs of calendar usage so as to appeal to the intended customers. These difficulties are especially true for postage meters which rely heavily on accurate date tracking for accounting and inspection purposes.

A typical postage meter (one example of a value dispensing system) applies evidence of postage, commonly referred to as a postal indicia, to an envelope or other mailpiece and accounts for the value of the postage dispensed. As is well known, postage meters include an ascending register, that stores a running total of all postage dispensed by the meter, and a descending register, that holds the remaining amount of postage credited to the meter and that is reduced by the amount of postage dispensed during a transaction. The postage meter generally also includes a control sum register which provides a check upon the descending and ascending registers. The control sum register stores a running account of the total funds having been added into the meter over the life of the meter. In this manner, the control sum register must always correspond with the summed readings of the ascending and descending registers. That is, the control sum register is the total amount of postage ever put into the postage meter and is alterable only when adding funds to the meter. Using the ascending, descending and control sum registers, the dispensing of postal funds may be accurately tracked and recorded by a governing postal authority.

Furthermore, postage meters are heavily regulated by the governing postal authority which typically requires that the postage meters contain a secure real time clock for ensuring accurate date tracking. Generally, each postal authority requires that the postage meter print at least the following: (i) the current date or some other date within a fixed bandwidth around the current date; (ii) the postage meter serial number; (ii) the value of the postage dispensed as part of the postal indicia. In this manner, the postal authority may monitor the usage and operation of the postage meter. Typically, the postal authorities require that the printed date correspond to the actual date that the mailpiece is deposited with the postal authority for delivery. Dates may also be used by the postal authority for accounting and/or inspection purposes. For these reasons, the postage meter manufacturer typically enters the correct date into the postage meter prior to installation at a customer location. In this way, the date information is secured from tampering by the customer.

Thus, there is a need for a postage meter having an adaptable calendar system capable of supporting a variety of different types of calendars. Additionally, there is a need for a postage meter having the capability to reconcile minor variations in time that may result from calendar irregularities, such as those discussed above.

SUMMARY OF THE INVENTION

The present invention provides a cost effective means for reconciling dates among disparate calendars once the postage meter has been placed into service at a customer's location.

In conventional fashion, this invention may be incorporated into a variety of postage printing systems, such as: a postage meter, a mailing machine, a postage evidencing device, and the like. Those skilled in the art will recognize that for the purposes of this application, postage printing systems further include: value dispensing systems, tax coupon printing systems, validation certificate issuing systems, and the like.

In accordance with the present invention, there is provided a postage printing system includes a device to monitor the passage of a unit of time, a calendar profile, a system date and a control system. The calendar profile has parameterized data including day, month, year and leap year information so that dates may be reconciled. The control system is for advancing the system date depending upon the information contained with the calendar profile and the passage of a given amount of time.

In accordance with the present invention, there is also provided a method of manufacturing a postage printing system.

Therefore, it is now apparent that the present invention substantially overcomes the disadvantages associated with the prior art. Additional advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention. As shown throughout the drawings, like reference numerals designate like or corresponding parts.

DETAILED DESCRIPTION OF THE PREFERRED EMBODIMENTS

Figure 1A:
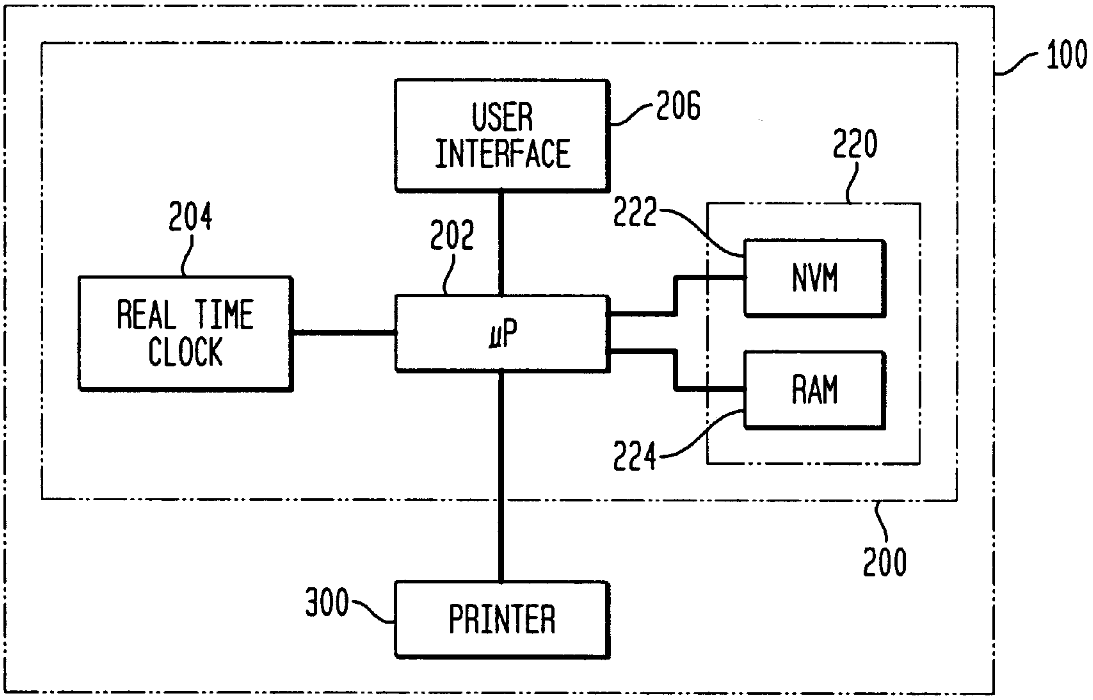
FIG. 1A is a simplified schematic of a particular type of postage printing system in which the present invention may be employed.

Referring to FIG. 1, an example of a postage metering system 100 in which the present invention may be employed is shown. The postage metering system 100 includes a control system 200 and a printer 300 in operative communication with the control system 200. The control system 200 includes a microprocessor 202, a real time clock 204, a user interface 206 and a memory module 220, all in operative communication with each other.

The microprocessor 202 controls the operation of various modules of the postage metering system 100 by running the various software control programs. Any conventional microprocessor or micro-control system having sufficient computing power and output pins necessary to support the functionality of the postage metering system 100 may be employed.

The real time clock 204 is a time keeping device programmed to generate a running count of seconds. In this manner, the real time clock 204 keeps track of the passage of a unit of time. Since the length of days may vary between calendars, the second is a convenient unit of time common to all calendars. The real time clock 204 keeps track of the time even when the overall postage metering system 100 is powered off. Generally, any conventional real time clock running on its own dedicated or uninterrupted power source (such as a special battery, not shown) that is not connected to the normal power supply (not shown) for the postage metering system 100 may be employed. Preferably, the real time clock 204 is secured from unauthorized manipulation by the operator once the date and time have been established by the manufacturer of the postage metering system 100.

The user interface 206 includes a display (not shown) and a keypad (not shown) where the operator may view messages and enter commands into the postage metering system 100 via any conventional menu system.

The memory module 220 includes a non-volatile memory or NVM 222 and a random access memory or RAM 224. The NVM 222 may be any storage device (Flash, CMOS battery backed RAM, EEPROM, or the like) which preserves data in between power cycles of the postage metering system 100 so that data stored within the NVM 222 is not lost.

Figure 1B:
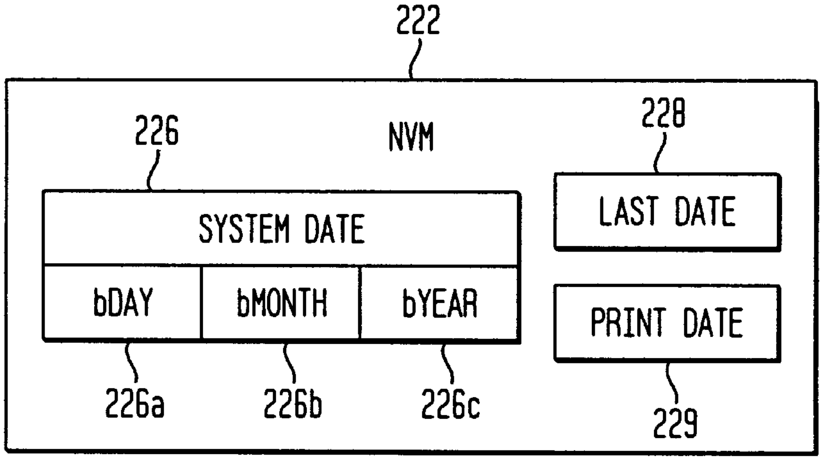
FIG. 1B is a simplified schematic of a NVM including a plurality of system variables used in accordance with the present invention.
Figure 2A:
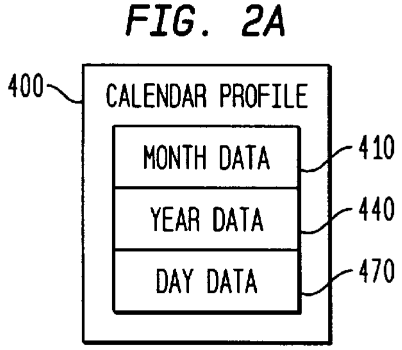
FIG. 2A is a block diagram of a calendar profile in accordance with the present invention.

Referring to FIG. 2A in view of the structure of FIG. 1, a block diagram of a calendar profile 400 stored within the NVM 222 is shown. The calendar profile 400 includes month data 410, year data 440 and day data 470 which together and in cooperation with the microprocessor 202, the real time clock 204 and suitable control software, discussed in detail below, provide the postage metering system 100 with a parameterized system for supporting any calendar. Preferably, the calendar profile 400 is stored in a protected or otherwise inaccessable region of the NVM 222 so that it is secured from unauthorized manipulation by the operator once it has been established by the manufacturer of the postage metering system 100.

Figure 2B:
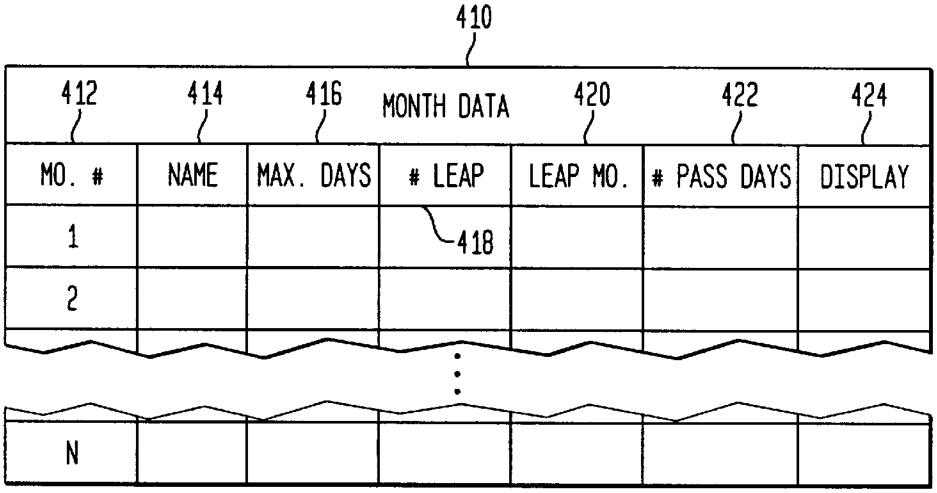
FIG. 2B is a table of month data relating to the calendar profile in accordance with the present invention.

Referring to FIG. 2B in view of FIG. 2A and the structure of FIG. 1, the details of the month data 410 are shown in tabular form. The month data includes a listing for each month of a particular calendar. The listing includes: the month number 412; a month name 414; a maximum possible number of days 416 in each month; a number of leap days 418 that represent extra days that are present in the month during a leap year, an indicator 420 of whether or not the month is a leap month; a number 422 of pass through days and month display data 424. The month number 412 ranges from one to N, where N is the maximum number of possible months in the particular calendar's year. The maximum possible number of days 416 in each month includes those days which are only present during leap years and/or which are only present if anticipated lunar sighting go unobserved. Certain calendars have months which are only present during leap years. Therefore, the indicator 420 of whether or not the month is a leap month is used to skip or include leap months during any particular year. The number 422 of pass through days indicates the number of days at the end of the month that may not be present each year depending upon unpredictable variations in the length of a month such as caused by lunar sightings discussed above. The month display data 424 includes any information required by the user interface 206 to display the month.

Figure 2C:
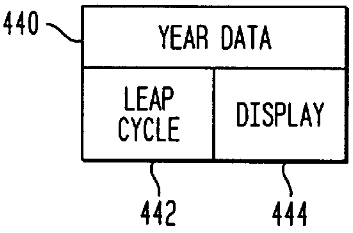
FIG. 2C is a table of year data relating to the calendar profile in accordance with the present invention.

Referring to FIG. 2C in view of FIGS. 2A and 2B and the structure of FIG. 1, the details of the year data 440 are shown. The year data 440 includes an indicator 442 of the leap year cycle for the particular calendar and year display data 444. The leap year cycle indicator 442 details how to determine the leap years so that the postage metering system 100 may distinguish between leap years and regular or non-leap years. For example, in the Julian Calendar every year divisible by four (4) is a leap year. In contrast, in the Gregorian Calendar every year divisible by four (4) is a leap year unless it is a century year (500, 1300, 1900, etc.) not divisible by four hundred (400). That is, in the Gregorian Calendar the year 2000 is a leap year while the year 2100 is not. The year display data 444 includes any information required by the user interface 206 to display the year.

Figure 2D:
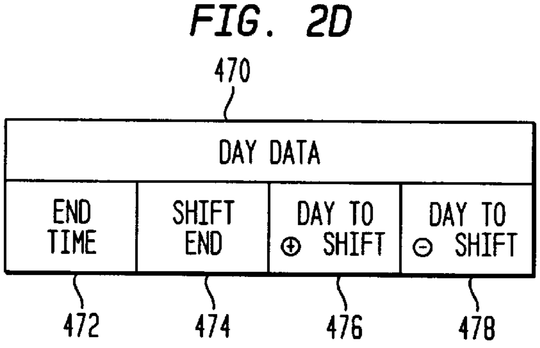
FIG. 2D is a table of day data relating to the calendar profile in accordance with the present invention.

Referring to FIG. 2D in view of FIGS. 2A, 2B and 2C and the structure of FIG. 1, the details of the day data 470 are shown. The day data 470 includes: an end time 472; a shift end 474; a forward shift day 476 and a backward shift day 478. The end time 472 indicates the time of day that the system date (comprised of a current day, a current month and a current year), described in more detail below, changes. The shift end 474 is a constant number of seconds to increment the end time 472 by each day. In this manner, provisions are made for those calendars which are based upon the setting of the sun. However, those skilled in the art will recognize that for the Gregorian Calendar the end time 472 will be set to 12:00:00 midnight while the shift end 474 will be set to zero (0) seconds. The forward shift day 476 indicates the date to start using the shift end 474 to advance the end time 472 (i.e.—the sun sets later and later) while the backward shift day 478 indicates the date to start using the shift end 474 to retreat the end time 472 (i.e.—the sun sets earlier and earlier). Generally, the forward shift day 476 and the backward shift day 478 are set to approximate the spring and winter solstice, respectively.

Referring to FIGS. 1A and 1B, stored within the NVM 222 are several system variables used for date tracking and operational purposes. As introduced above, the NVM 222 includes a SYSTEM DATE 226 consisting of bDAY 226*a,* bMONTH 226*b* and bYEAR 226*c* where bDAY 226*a* represents the current day of the month, bMONTH 226*b* represents the current month of the year and bYEAR 226*c* represents the current year. The NVM 222 also includes a variable LASTDATE 228 which stores a record of the most recent date upon which the SYSTEM DATE 226 was changed via a date advance routine 500 (not shown) described in more detail below.

Prior to or during installation at a customer's facility, the SYSTEM DATE 226 is established by having a customer service representative or other authorized representative enter in numbers for bDAY 226*a,* bMONTH 226*b* and bYEAR 226*c*. Preferably, this is accomplished using a special set-up panel or other routine not accessible by the operator of the postage metering system 100. For the sake of standardization of a postage metering system 100 with global distribution, it is preferable to set bDAY 226*a,* bMONTH 226*b* and bYEAR 226*c* equal to Greenwich Mean Time (GMT) and then establish an offset parameter (not shown) indicating a number of hours that GMT differs from the anticipated installation time zone.

Figure 3:
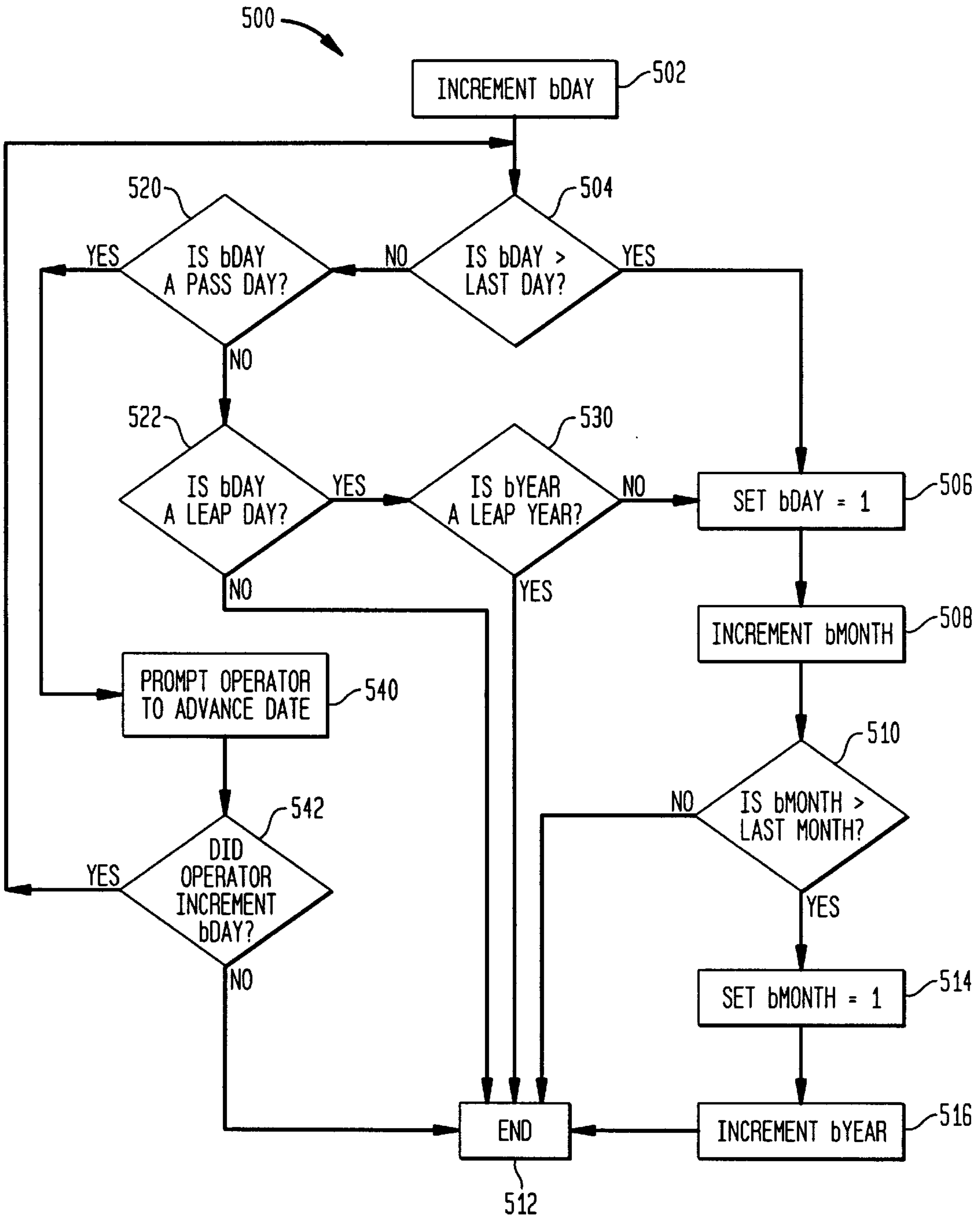
FIG. 3 is a routine showing the a date advance algorithm in accordance with the present invention.

With the structure of the postage metering system 100 described as above, the operational characteristics will now be described. Referring to FIG. 3, in view of the structure of FIGS. 1A, 1B, 2A, 2B, 2C and 2D, a routine 500 describing a date advance algorithm for adjusting the SYSTEM DATE 226 is shown. At 502, bDAY 226*a* is incremented or advanced by a given integer number of days. The details of how this determination is made and how many days to advance is described in more detail below. At 504, a determination is made whether or not bDAY 226*a* is greater than the maximum possible number of days 416 for bMONTH 226*b*. If yes, then, at 506, bDAY 226*a* is set equal to one (1). Next, at 508, bMONTH 226*b* is incremented by one (1) until a month actually present in the year is located. This may be accomplished by checking to see if that month is a leap month or not using the leap month indicator 420. Thus, if the next month is always present or if the next month is a leap month and it is a leap year, then bMONTH 226*b* is incremented once. On the other hand, bMONTH 226*b* is incremented more than once until a month that is present is located or a maximum value is reached. Next, at 510, a determination is made whether or not bMONTH 226*b* is greater than the last available month, the maximum number of possible months N, for bYEAR 226*c*. Those skilled in the art will recognize that the maximum value discussed above is set to be greater than N. If no, then, at 512, the routine 500 ends. If, at 510, the answer is yes, then, at 514, bMONTH 226*b* is set equal to one (1). Next, at 516, bYEAR 226*c* is incremented by one (1) before the routine ends at 512.

If, however, at 504, the answer is no, then, at 520, a determination is made whether or not bDAY 226*a* is a pass through day. If yes, then, at 540, the operator is prompted to advance bDAY 226*a* by allowing the operator to view a current value for bDAY 226*a* via the user interface 206. Next, at 542, a determination is made whether or not the operator has incremented bDAY 226*a* or accepted the current value for bDAY 226*a* based upon the operator's input via the user interface 206. If the operator accepts the current value for bDAY 226*a,* then, at 512, the routine 500 ends. On the other hand, if the operator increments bDAY 226*a,* then control returns to 504. Thus, in the preferred embodiment, the operator is only allowed to increment bDAY 226*a* one day at a time before control returns to 504. Those skilled in the art will now recognized that this facility gives the operator the ability to instruct the postage metering system 100 whether or not the pass through days are present. In the preferred embodiment, this type of operator intervention is one way. That is, the operator may not reverse or undue these actions so that tampering with the actual date by both advancing and later retrogressing the date or vice versa.

If, however, at 520, the answer is no, then, at 522, a determination is made whether or not bDAY 226*a* is a leap day. If no, then, at 512, the routine 500 ends because bDAY 226*a* is present all the time. On the other hand, if, at 522, the answer is yes, then, at 530, a determination is made whether or not bYEAR 226*c* is a leap year. If yes, then, at 512, the routine 500 ends because leap days are present during a leap year. If, at 530, the answer is no, then control proceeds to 506 because it is not a leap year and leap days are not present.

Figure 4:
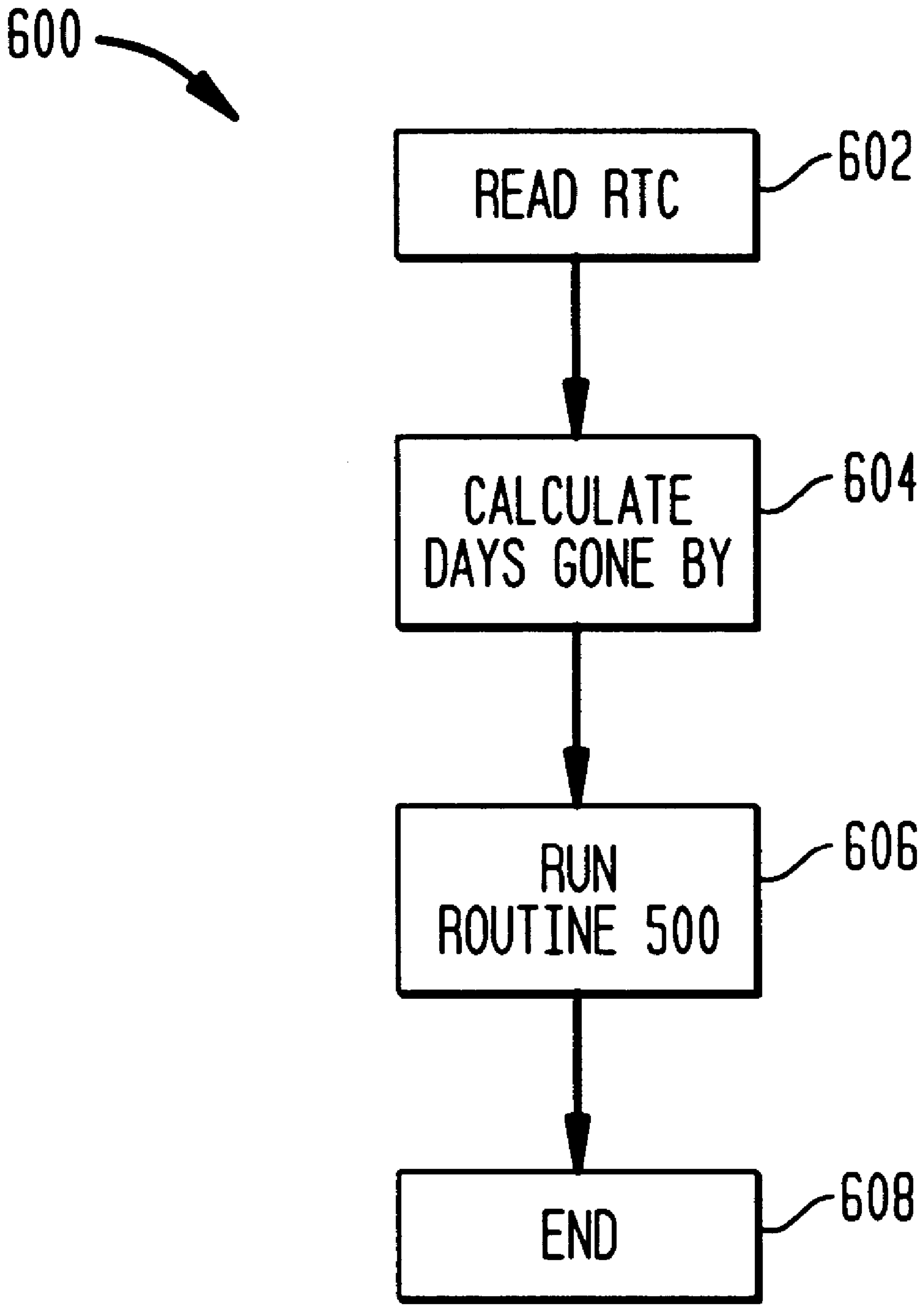
FIG. 4 is a routine showing when the date advance algorithm is run in accordance with the present invention.

Referring to FIG. 4, in view of the structure of FIGS. 1A, 1B, 2A, 2B, 2C and 2D and the description associated with FIG. 3, a routine 600 describing when the date advance routine 500 is run is shown. Generally, the routine 600 may be run at midnight, end time 472, power-up of the postage metering system 100 or at any other convenient time or some combination of these. At 602, the count of the real time clock 204 is read. Next, at 604, the number of days that have gone by since the last time the SYSTEM DATE 226 was changed is calculated. This may be achieved by storing the real time clock count when the SYSTEM DATE 226 is changed and subtracting the stored real time clock count from the current real time clock count. In this way, a number of seconds from the last date change may be obtained. By dividing the number of seconds from the last date change by 86,400 (1 day=24 hours/day×60 minutes/hour×60 seconds/minute), a number of elapsed days may be calculated. Next, at 606, the routine 500 is run if the number of elapsed days is greater than or equal to one. Otherwise, the routine 500 is not run. Following the running or not running of routine 500, the routine 600 ends at 608.

Referring generally to FIGS. 1A, 1B, 2A, 2B, 2C, 2D, 3 and 4, those skilled in the art will now appreciate that the calendar profile 400 and the advance date routine 500 provide an efficient system for accurately tracking dates. Moreover, by providing the postage metering system 100 with more than one calendar profile, the postage metering system 100 may switch between calendars without any demanding calculations or guesswork since the precise date is concurrently being tracked according to each calendar profile 400. If more than one calendar is employed, the operator may select which calendar to use simply entering appropriate commands via the user interface 206. Also, the flexibility to adjust for variances as discussed above in one calendar (i.e. Hirji Calendar) without influencing the other calendars is present. Thus, the calendars are independent of each other which allows for the adjustment of several calendar days around lunar sightings without disturbing the Gregorian date. That is, the dates between various calendars may move relative to each other since the system date is tracked according to each calendar profile and date advance routine individually.

Those skilled in the art will also recognize that not all calendars require all of the parameters discussed above.

Therefore, some of the values discussed above may be zero while others have an indication that they are not used for a particular calendar. For example, in the Gregorian Calendar the leap month indicator 420 is the same (no, not a leap month) for every month because there are not any months which only occur during leap years.

Generally, in the preferred embodiment it is anticipated that each postage meter system 100 may contain at least a Gregorian Calendar profile. Other calendar profiles may also be provided as deemed necessary. However, for all postage meter systems 100 that do include a Non-Gregorian Calendar profile, certain system level operations (remote inspections, postage downloading, error reports, software updates, rate table adjustments, etc.) may default to using the Gregorian Calendar for the convenience of the postage meter system manufacturer.

Figure 5:
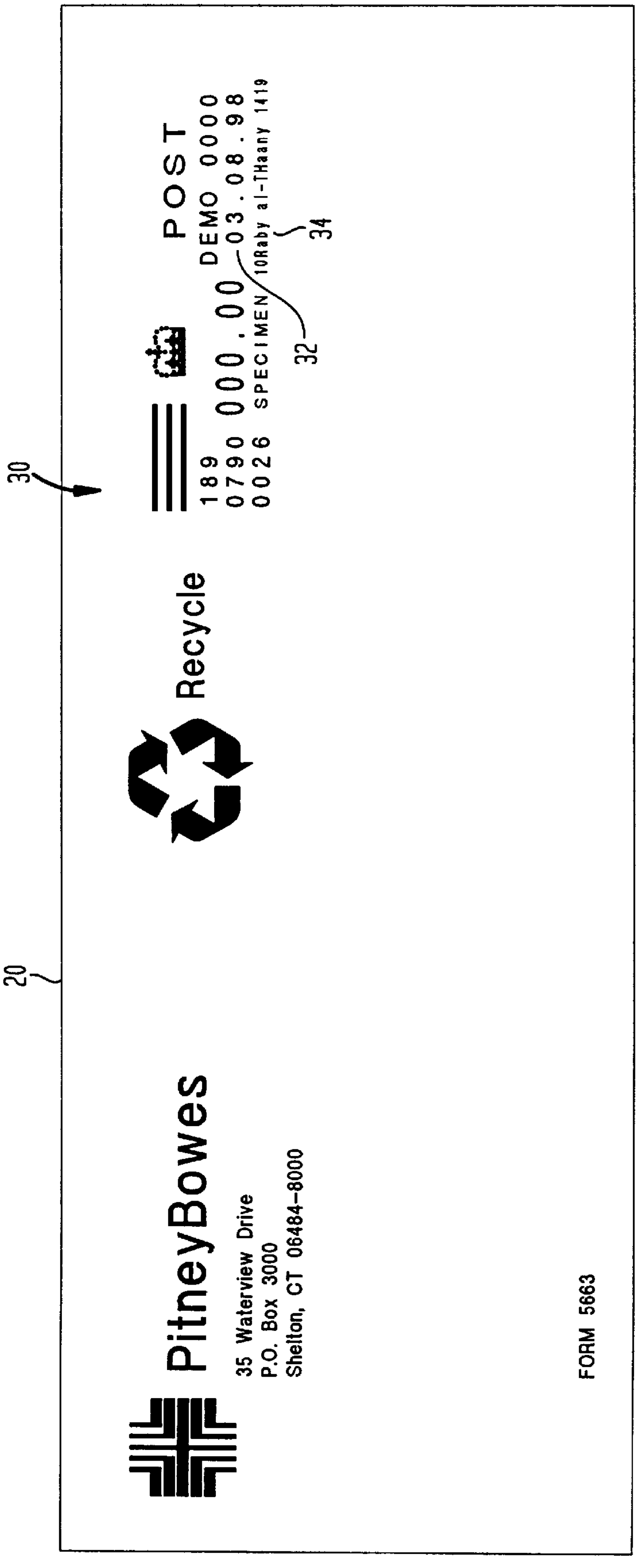
FIG. 5 is an envelope having printed thereon a postal indicia in accordance with the present invention.

Referring to FIG. 5 in view of the structure of FIGS. 1A and 1B, an envelope 20 having printed thereon a postal indicia 30 as evidence of postage is shown. Although generally it is anticipated that only one date need be printed, in this example, the postage printing system 100 prints two dates on the envelope 20. Here, the dates correspond to a Gregorian Calendar profile and a Hijri Calendar profile where the postal indicia 30 includes a Gregorian date 32 of Aug. 3, 1998 and a corresponding Hirji date 34 of 10 Raby al-Thaany 1419. This may prove desirable in those locations where it is common practice to use multiple calendars.

Also, according to another feature of the present invention, the postage printing system 100 may store a variable PRINTDATE 229 corresponding to the date or dates 32 and 34 that are printed as part of the postal indicia 30. Generally, the PRINTDATE 229 defaults to the SYSTEM DATE 226. However, the operator may advance the PRINTDATE 229 using techniques similar to those discussed above so that the PRINTDATE 229 is different from the SYSTEM DATE 226. Typically, the governing postal authority will establish a bandwidth around the actual or SYSTEM DATE 226 that is acceptable for printing. Most often, back dating the PRINTDATE 229 is not allowed while forward dating the PRINTDATE 229 is allowable within a given number of days. Those skilled in the art will appreciate that back dating may be achieved by employing analogous algorithms to those discussed above.

It should now be apparent that by providing an adaptable calendar system capable of supporting a variety of different types of calendars the postage printing system 100 may be easily marketed on a global basis. Furthermore, by providing calendar profiles and a date advance algorithm, the postage printing system 100 may be reconfigured or reparameterized easily. This allows the manufacturer to remove postage printing systems 100 from locations where they are in excess supply and redeploy them in locations where they are in short supply with only minor changes to account for any differences in local calendars.

Many features of the preferred embodiment represent design choices selected to best exploit the inventive concept as implemented in a universal postage printing system suitable for global distribution. Those skilled in the art will recognize that various modifications can be made without departing from the spirit of the present invention. For example, instead of having the Gregorian Calendar follow a respective calendar profile, it is possible to utilize more conventional techniques, such as: purely counting time without reference to a calendar profile. As another example, the control system of the present invention is described in terms of a particular processor, clock, memory and software design as discussed above, however, any suitable combination of components may be employed. As yet another example, the operator may desire to switch back and forth between various calendars. Thus, by entering appropriate commends via the user interface, the operator may select which calendar is the "active" calendar for certain operations, such as: printing and display on the user interface.

Therefore, the inventive concepts in their broader aspects are not limited to the specific details of the preferred embodiment but are defined by the appended claims and their equivalents.

What is claimed is:

1. A method of manufacturing a postage printing system, comprising the step(s) of:

providing a device to monitor the passage of a unit of time;

establishing a calendar profile having parameterized data including day, month, year and leap year information so that dates may be reconciled;

setting a system date; and providing a control system for advancing the system date depending upon the information contained with the calendar profile and the passage of a given amount of time.

2. The method of claim 1 wherein the calendar profile is representative of a Gregorian Calendar, the method further comprising the step(s) of:

establishing a second calendar profile representative of a Non-Gregorian Calendar, the second calendar profile having parameterized data including day, month, year and leap year information so that dates may be reconciled; and providing a control system for advancing the system date within the Non-Gregorian Calendar independent of the system date within the Gregorian Calendar.

3. The method of claim 2, further comprising the step(s) of:

having the control system allow an operator to select an active calendar between the calendar profile and the second calendar profile to define which is to be used for certain operations.

4. The method of claim 3, further comprising the step(s) of:

providing a printer in operative communication with the control system for printing a postal indicia having the system date;

having the control system be capable of printing within the postal indicia the system date in both the Gregorian Calendar and the Non-Gregorian Calendar.

5. The method of claim I further comprising the step(s) of:

establishing the calendar profile as a Non-Gregorian Calendar;

providing a Gregorian Calendar tracking system; and providing a control system for advancing the system date within the Non-Gregorian Calendar independent of the system date within the Gregorian Calendar.

6. The method of claim 5, further comprising the step(s) of:

having the control system allow an operator to select an active calendar between the calendar profile and the Gregorian Calendar tracking system.

7. A postage metering system, comprising:

a device to monitor the passage of a unit of time;

a calendar profile having parameterized data including day, month, year and leap year information so that dates may be reconciled;

a system date; and a control system for advancing the system date depending upon the information contained with the calendar profile and the passage of a given amount of time.

8. The system of claim 7 wherein the calendar profile is representative of a Gregorian Calendar, the system further comprising:

a second calendar profile representative of a Non-Gregorian Calendar, the second calendar profile having parameterized data including day, month, year and leap year information so that dates may be reconciled; and wherein the control system for advances the system date within the Non-Gregorian Calendar independent of the system date within the Gregorian Calendar.

9. The system of claim 8, further comprising:

a user interface for communicating messages to and receiving input from an operator; and wherein the control system allows the operator to select an active calendar between the calendar profile and the second calendar profile to define which is to be used for certain operations.

10. The system of claim 9, further comprising:

a printer in operative communication with the control system for printing a postal indicia having the system date; and wherein the control system is capable of printing within the postal indicia the system date in both the Gregorian Calendar and the Non-Gregorian Calendar.

11. The system of claim 7 wherein the calendar profile is representative of a Non-Gregorian Calendar, the system further comprising:

a Gregorian Calendar tracking system; and wherein the control system advances the system date within the Non-Gregorian Calendar independent of the system date within the Gregorian Calendar.

12. The system of claim 11, further comprising:

a user interface for communicating messages to and receiving input from an operator; and wherein the control system allows the operator to select an active calendar between the calendar profile and the Gregorian Calendar.

* * * * *